2 Sheets—Sheet 1.

J. K. ALWOOD.

APPARATUS FOR TRANSMITTING POWER.

No. 6,921. Reissued Feb. 15, 1876.

WITNESSES

Harry King

H. H. Young

By

INVENTOR

Josiah K. Alwood.

Wm D. Baldwin, his Attorney

N. PETERS, PHOTO-LITHOGRAPHER, WASHINGTON, D. C.

J. K. ALWOOD.

APPARATUS FOR TRANSMITTING POWER.

No. 6,921. Reissued Feb. 15, 1876.

WITNESSES
Harry King Del.
H. H. Young

By

INVENTOR
Josiah K Alwood

Wm D. Baldwin Jr Attorney

N. PETERS, PHOTO-LITHOGRAPHER, WASHINGTON, D. C.

UNITED STATES PATENT OFFICE

JOSIAH K. ALWOOD, OF METZ, INDIANA, ASSIGNOR, BY MESNE ASSIGNMENTS, TO SAMUEL S. WHITE, OF PHILADELPHIA, PENNSYLVANIA.

IMPROVEMENT IN APPARATUS FOR TRANSMITTING POWER.

Specification forming part of Letters Patent No. 79,179, dated June 23, 1868; reissue No. 6,921, dated February 15, 1876; application filed January 3, 1876.

*To all whom it may concern:*

Be it known that I, JOSIAH K. ALWOOD, formerly of Delta, in the county of Fulton and State of Ohio, but now residing at Metz, in the county of Steuben and State of Indiana, have invented certain new and useful Improvements in Apparatus for Transmitting Power, of which the following is a specification:

My invention relates to an apparatus for transmitting power of that class in which the instrument to be operated is connected to the driving-power by flexible connections, which admit of the free movement of the instrument held in the hand of the operator in various directions without interrupting the transmission of the driving-power.

Its object is to obtain a cheap, simple, effective, and portable instrument, which may be worked by the foot of the operator while directing the operating tool with his hands; which ends I attain by combining a treadle-motion and driving mechanism with an operating instrument driven by belt-connections, and suspended so as to be capable of moving freely in various directions, the tension of the belt-connections being preserved by a spring-tension apparatus, which keeps the belt taut and accommodates it to the movements of the apparatus.

The subject-matter claimed is hereinafter specifically designated.

In the accompanying drawings, all my improvements are shown as embodied in a machine for shearing sheep; obviously, however, some of them may be used without the others, and in machines differing somewhat in construction from that herein shown.

Figure 1:
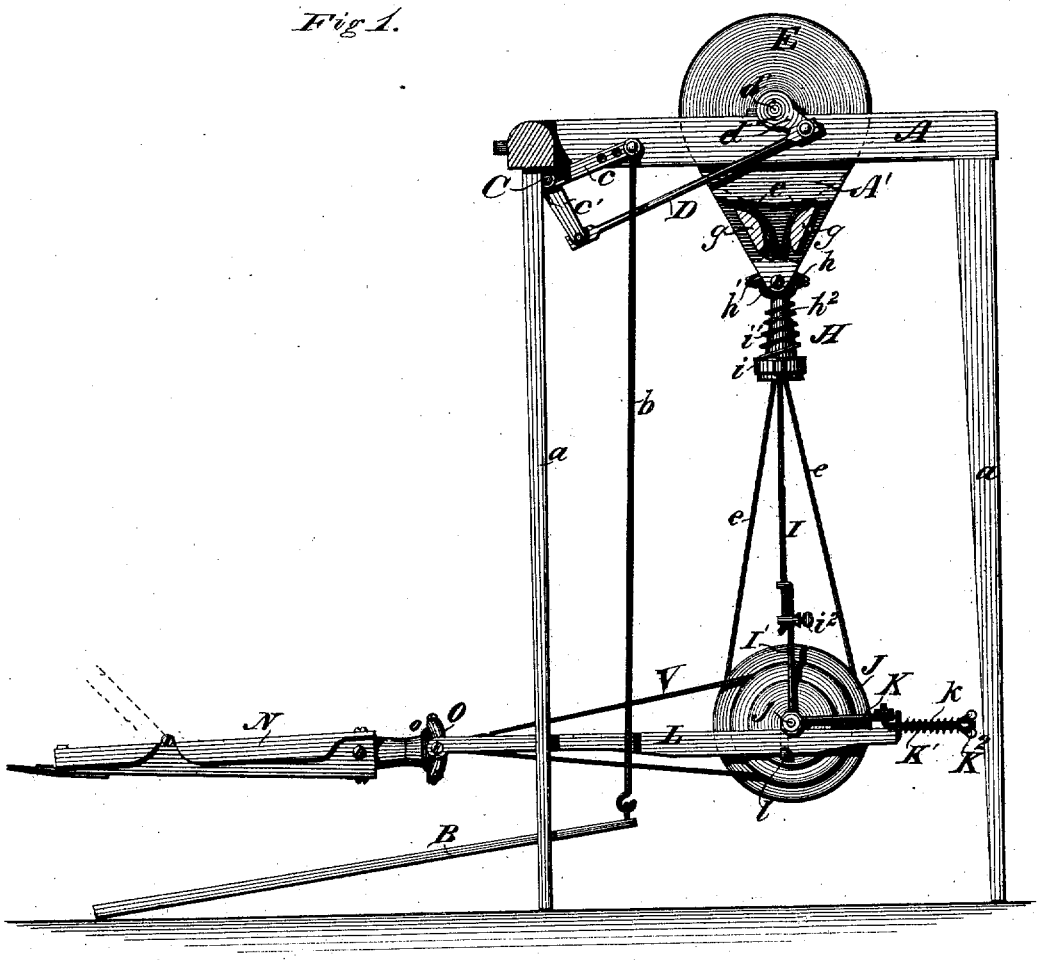
Figure 4:
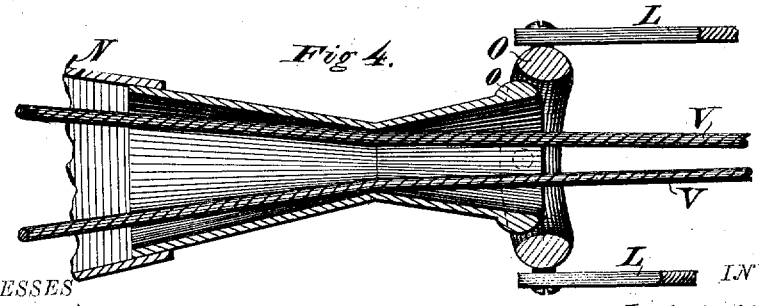
Figure 2:
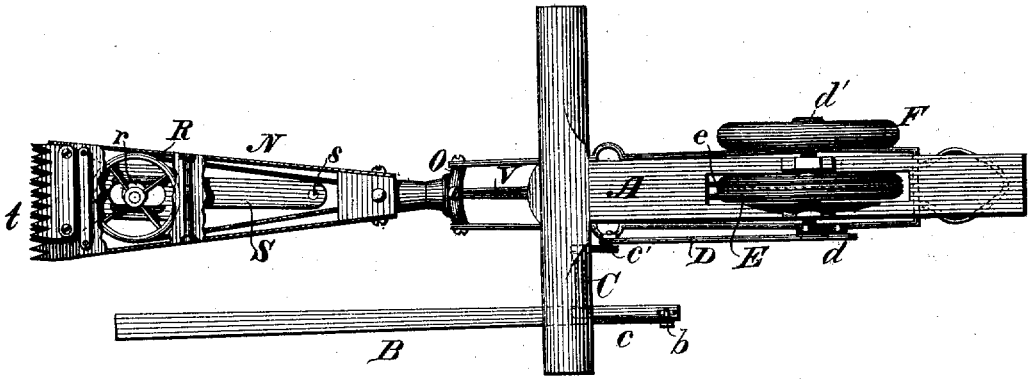
Figure 3:
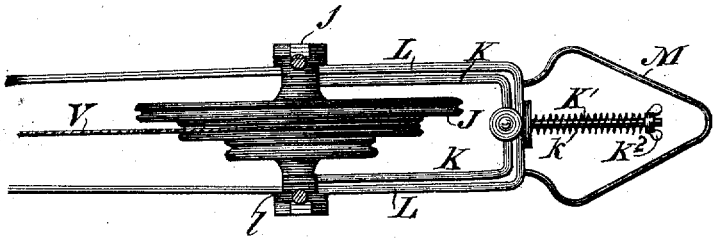

Figure 1 represents a side elevation of my improved machine, with a portion of the casing broken away to show the parts behind it. Fig. 2 is a plan or top view of the apparatus with the cover of the instrument broken away. Fig. 3 represents a plan view of a portion of the mechanism concealed by the frame in the preceding figures, and Fig. 4 is a horizontal section of a portion of the hand-piece of the instrument.

The driving mechanism is shown as mounted on a T-shaped frame, A, firmly supported on legs *a*. A treadle, B, is connected by a treadle-rod, *b*, with an arm, *c*, on a rock-shaft, C, mounted in the frame A. A crank-arm, *c'*, on this rock-shaft is connected by a pitman, D, with the crank *d* of a driving-shaft, *d'*, on which a driving-wheel, E, and balance-wheel, F, are mounted, and as the crank *c'* is longer than the crank *d*, the oscillation of the crank-shaft C imparts a continuous rotatory movement to the driving-shaft *d'*.

The treadle B, it will be observed, is unattached to the frame-work, and may, consequently, be moved around in various positions to suit the operator.

The operating-cord or driving-belt *e* passes around the driving-wheel E and over guides *g* in the frame, and through a swivel-thimble, H, to a driven pulley, J. This swivel-thimble consists of a ring, *h*, pivoted on opposite sides to the swivel holder or frame A' by screws $h^1$, so as to allow it to rock vertically. A conical tube or sleeve, $h^2$, suspended from this ring, has a flange on its lower end, on which rests the swivel-ring *i*, which is pressed down by a spiral spring, $i^1$, encircling the conical sleeve, in order to maintain the tension on the driving-belt. Tension-bars descend from the swivel-ring *i*, and are made in two sections, I I', sliding endwise, one upon the other, and capable of being clamped together in any desired position by set-screws $i^2$, to regulate the tension of the driving-belt.

The driven pulley or pendent wheel J turns on a shaft, *j*, revolving in boxes on these pendent or tension rods, which thus support the pulley, and permit of its boxes rocking on the shaft when in use, and when the tension-bars are swung back and forth. A tension-yoke, K, pivoted on the shaft of the pulley J, extends around said pulley. A tension-frame, L, likewise encircles this pulley, and is supported by, and slides endwise in, guides *l*, secured to the tension-yoke K, or the boxes of the pulley J. A rod, $K^1$, extends from the tension-yoke K, through the tension-frame L. A spiral spring, *k*, on this rod, regulated by a set-screw, $K^2$, acts upon the tension-frame, and tends to hold the two together, to preserve the tension of the driving-belt. A fender or guard frame, M, encircles the tension-screw to protect it from injury.

The tension-frame L is coupled with the casing or hand-piece N of the instrument by a universal-swivel thimble-joint, O, the only difference between this joint and that of the swivel-joint H, above described, being that the swivel O does not slide. Its offices are, however, the same in other respects, although its thimble or tube differs in external appearance, one end being made prismatic, to fit into the case of the operating instrument.

The casing of the instrument is shown, in this instance, as composed of three pieces, so shaped and fitted as to constitute a hollow box, prismatic in shape, as shown in the drawing.

A pulley, R, revolving in suitable bearings in the hand-piece or case, carries an eccentric, *r*, which works in a slot in a lever, S, oscillating on a pivot, *s*, which vibrates cutters *t*, similar to those of a harvester, in a well-known way, which need not here be described. The pulley R is driven by a cord or belt, V, from the pulley J, which cord is always kept taut by the tension devices hereinbefore described.

The advantages and mode of operation of my improved apparatus will readily be understood from the foregoing description. The belt *e* is kept taut by the spring $i^1$, and the belt V by the spring *k*. The pulley J and its frame turns horizontally on the swivel-joint H, while the instrument swivels on its joint O, thus allowing great freedom of movement in various directions.

I am aware that sheep-shears have heretofore been driven by flexible connections, and do not broadly claim such mode of operation; but, previous to the date of my invention, I am unaware of any such apparatus driven by self-adjusting belt-connections, accommodating themselves to the movements of the mechanism.

I claim as of my own invention—

1. The combination, substantially as hereinbefore set forth, of a portable frame, on which the driving mechanism is mounted, a treadle for operating said mechanism, an instrument suspended so as to be capable of moving freely in various directions, belt-connections between the driving mechanism and operating instrument, and a tension-spring, whereby the driving-belt is kept taut, notwithstanding variations in the positions of the operating instrument.

2. The combination, substantially as hereinbefore set forth, of the operating instrument, the belt-connections, the driving mechanism, and loose treadle, whereby the position of the treadle relatively to the instrument may be varied.

3. The combination, substantially as hereinbefore set forth, of the operating tool or instrument, the belt-connections, the driving mechanism, and a self-acting tension device, interposed between the instrument and its driving mechanism, for the purposes specified.

4. The combination, substantially as hereinbefore set forth, of the driving mechanism, the driven pulley, and the driving-belt, passing through a sleeve between the driving mechanism and driven pulley.

5. The combination, substantially as hereinbefore set forth, of the driving-pulley, the guides, the swiveled sleeve, and the driving-belt passing through the same.

6. The universal swivel-joint herein described, consisting of the combination of the hinged joint-ring, the flanged conical sleeve, the slide-swivel, and the tension-spring.

7. The combination, substantially as hereinbefore set forth, of the swivel-joint, the adjustable suspension bars, and the tension yoke and frame, for the purposes specified.

8. The combination, substantially as hereinbefore described, of the tension-yoke, the tension-frame, the pulleys mounted therein, the pulley in the casing, and the driving-belt.

JOSIAH K. ALWOOD.

Witnesses:
H. G. BOOTH,
E. C. ORTON.